United States Patent [19]

Cooper

[11] 4,347,068

[45] Aug. 31, 1982

[54] ADMISSION DEVICE FOR AN INLET MANIFOLD OF AN INTERNAL COMBUSTION ENGINE

[76] Inventor: Walter R. Cooper, 18 St. Helen's Way, Allesley, Conventry, West Midlands, England

[21] Appl. No.: 117,000

[22] Filed: Jan. 30, 1980

[51] Int. Cl.³ .................... B01D 50/00; F02M 23/04
[52] U.S. Cl. .................................. 55/319; 55/320; 55/385 B; 55/420; 55/DIG. 28; 123/585; 123/587
[58] Field of Search ............... 55/319, 385 B, 420, 55/527, 528, DIG. 13, DIG. 28; 123/585, 587; 137/171

[56] References Cited

U.S. PATENT DOCUMENTS

| | | | |
|---|---|---|---|
| 1,327,494 | 1/1920 | Sims | 55/420 X |
| 1,555,072 | 9/1925 | Patton | 55/420 |
| 2,606,628 | 8/1952 | Hasselwander | 55/319 |
| 2,876,757 | 3/1959 | Korienek | 123/587 |
| 3,272,192 | 9/1966 | Jensen et al. | 55/528 |
| 3,463,132 | 8/1969 | Krieck | 123/587 X |
| 3,721,069 | 3/1973 | Walker | 55/319 |
| 3,809,037 | 5/1974 | Lokka | 123/585 |
| 3,915,678 | 10/1975 | Felker | 55/319 |
| 3,990,420 | 11/1976 | Bitterman et al. | 123/585 |
| 4,160,433 | 7/1979 | Olson | 123/585 X |

FOREIGN PATENT DOCUMENTS 781601 5/1935 France ................... 55/319

Primary Examiner—Robert H. Spitzer
Attorney, Agent, or Firm—Watson, Cole, Grindle & Watson

[57] ABSTRACT

An air admission device for an inlet manifold of an internal combustion engine in order to obtain improved fuel economy and reduced toxic exhaust emission comprises a closed container or capsule which provides an air expansion chamber and has a fine metering air inlet orifice for entry of atmosphere air into the chamber so as to be cooled therein prior to passage to and along an elongate air outlet tube communicating with the air chamber and adapted in use to be fitted in and through a hole provided therefor in an inlet manifold of an internal combustion engine whereby the container is exteriorly mounted on the manifold and the air outlet tube extends into the manifold in order to admit cool air from the chamber into the manifold for creating turbulence in the flow of a fuel/air mixture through the manifold into the engine. The chamber contains a body of foam texture material having a central opening and is carried by a deflector plate such that air entering the chamber through the air inlet orifice enters the central opening and is deflected by the deflector plate radially ouwardly through the body of foam material to an annular clearance about the latter for subsequent radial inward flow along radial channelling of the deflector plate to the communication of the air outlet tube with the chamber.

2 Claims, 7 Drawing Figures

ADMISSION DEVICE FOR AN INLET MANIFOLD OF AN INTERNAL COMBUSTION ENGINE

The object of this invention is to provide a simple and effective air admission device for promoting turbulence in a fuel/air mixture in an inlet manifold of an internal combustion engine with a view to obtaining improved fuel economy, smoother running of the engine and better performance as well as reduced toxic exhaust emission. Practical advantages of the invention will be apparent from the following disclosure.

A device according to the invention has particular practical application to the internal combustion engines of motor vehicles and especially as regards fuel economy provides a significant contribution to the fuel conservation program of the U.S. Department of Energy. As regards reduced toxic exhaust emission this is in the interests of minimising atmospheric pollution.

In practice the construction and operation of the device is as follows, reference being had to the accompanying drawings in which.

Figure 1:
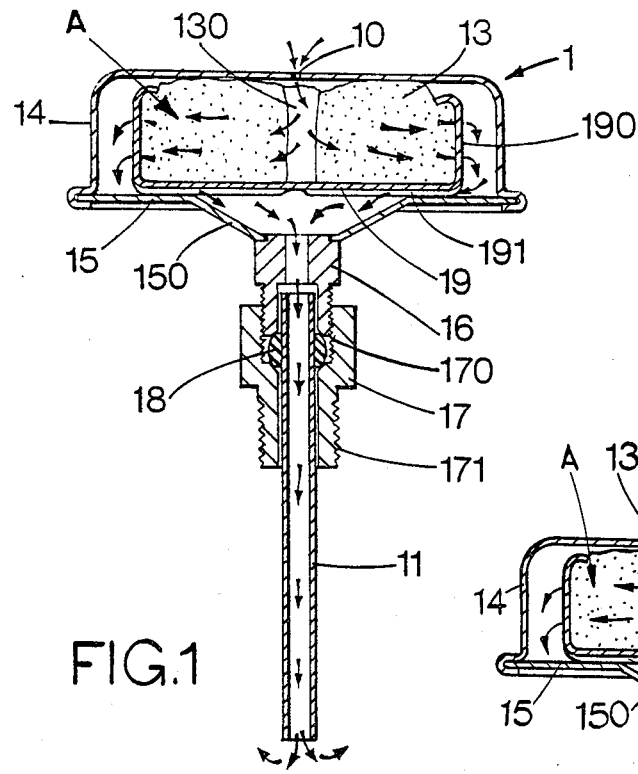
FIG. 1 is a view in axial plane section of the device per se.

The device comprises a closed container or capsule 1 providing an air expansion chamber A and having a fine metering air inlet orifice 10 at its upper side. The underside of the capsule 1 is provided with an elongate air outlet tube 11 communicating with the air expansion chamber A, which tube 11 is arranged to extend into an inlet manifold 2 of an internal combustion engine in a manner hereinafter referred to.

The capsule 1 is shown comprising a cap 14 crimped to a base plate 15, a recessed part 150 of the latter having a tubular threaded union member 16 secured to it. Screwed on to the union member 16 is the internal threaded part 170 of a union nut 17 whereby an olive 18 is located between the union member 16 and nut 17 firmly about the outlet tube 11 coaxially received by the union member 16 and nut 17. An externally threaded portion 171 of the nut 17 enables the device to be screwed into position of use in a threaded bore 21 such as in the upper side wall 24 of an inlet manifold 2 in the case of the side draught carburetor arrangement shown in FIG. 3. Constructional detail of the attachment of the tube 11 to the capsule 1 may be varied according to requirements.

Figure 3:
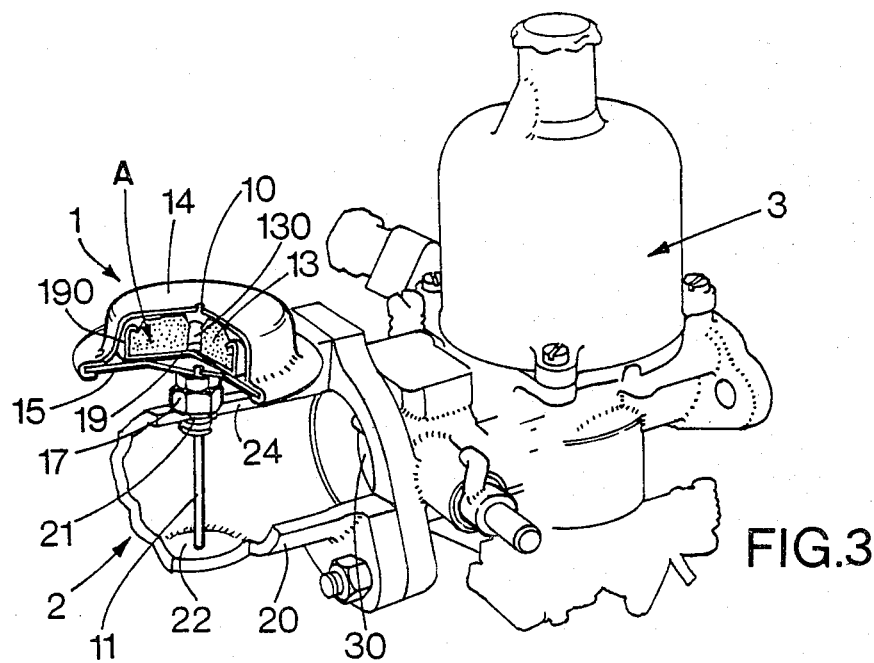
FIG. 3 shows a typical instance of the device installed in position of use.

On the device being installed in position of use and when the engine is running, the sub atmospheric induction pressure in the inlet manifold 2 causes atmospheric air to be drawn into the expansion chamber A through the fine orifice 10 and via the tube 11 into the lower part of the inlet manifold 2 (FIG. 3). The orifice 10 not only meters atmospheric air flow drawn into the chamber A but in conjunction with the latter imparts a cooling action to the air on entry into the chamber. Thus cold or cool air passes from the chamber A down the tube 11 into the lower part of the manifold 2.

Accommodated within the chamber A in the capsule 1 is a body 13 of foam or sponge texture material such as a suitable plastics material which filters atmospheric air drawn into the capsule 1 before it passes through the tube 11. The body 13 of foam material is shown located with annular clearance in the chamber A by a plate 19 having side lugs 190 upstanding therefrom which engage about the body 13 of foam or sponge material, the plate 19 also serving an an air flow deflector. For this purpose the body 13 is provided with a central opening 130 and the arrangement is such that air flow entering the chamber A through the inlet orifice 10 passes in a radially outward direction through the body 13 of foam material to the annular clearance about the latter and then inwardly between the plate 19 and base plate 15 of the capsule 1 prior to passage along the tube 11. Such air flow is indicated by the arrows in FIG. 1 and the deflector plate 19 is shown radially channelled at 191 at its underside for air flow between the plate 19 and the base plate 15 of the capsule 1. By this arrangement air flow through substantially the entire body 13 of foam material is obtained.

Referring to the side draught carburetor arrangement depicted in FIG. 3 the device is shown vertically mounted in the inlet manifold 2 and on the engine side of the carburetor 3, i.e. downstream of the usual throttle butterfly valve 30 so as to permit normal operation of the latter.

The extent of the tube 11 is such that it terminates at its lower end a short distance above the bottom wall 20 of the manifold 2 or, as shown, with similar clearance in a scavenge well 22 which is often provided in the bottom wall 20 of the manifold 2, i.e. closely over or adjacent the "hot spot" of the engine exhaust manifold.

The action of the device is such that a fuel/air mixture passing from the carburetor 3 and which tends to be rich in liquid fuel especially at the lower part of the manifold 2 adjacent the bottom wall 20, is subject to a metered cold or cool air stream from the tube 11. This has the effect of creating turbulence in the flow of the fuel/air mixture. As a result a more homogeneous mixture is obtained before it passes into the engine and an unduly rich mixture is avoided or minimised as well as the tendency for neat fuel to occur in the manifold 2 or to run from the latter.

In addition to the cooling action obtained in the expansion chamber A on atmospheric air entering it through the metering inlet orifice 10, an effect of creating some humidity in the air flow through the device may also be obtained dependent on atmospheric air conditions and in the interests of smoother running of the engine.

Figure 4:
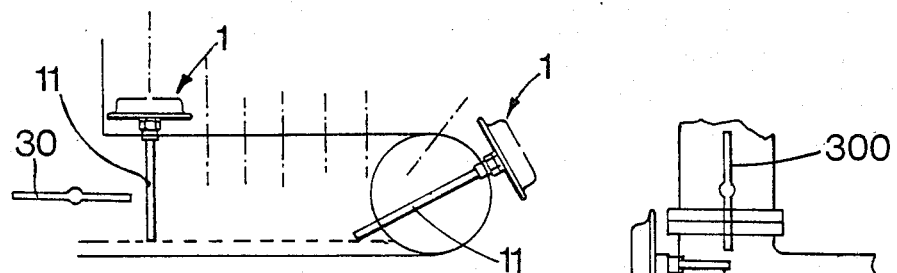
FIGS. 4 and 5 are diagrams showing other modes of use of the device.
Figure 5:
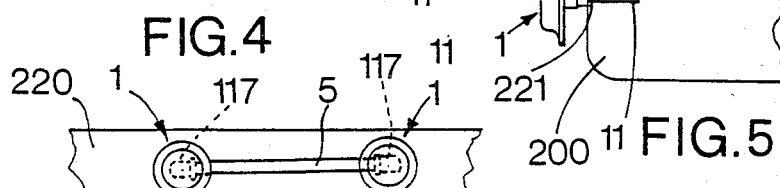
Figure 6:
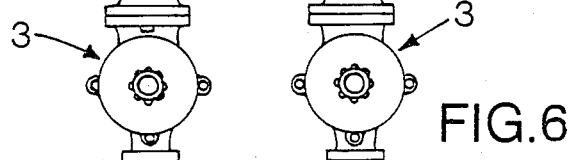
FIG. 6 is a diagrammatic plan view showing the use of two devices in a twin carburetor arrangement.

Various possible positions of the device in a side draught carburetor arrangement are diagrammatically indicated in FIG. 4. In the case of a down draught carburetor arrangement as per FIG. 5, the tube 11 of the device is shown horizontally mounted through an opening 221 in the side of the inlet manifold 200 immediately below the butterfly throttle valve 300, the tube 11 extending to a mid part or thereabouts of the inlet bore of the manifold 200.

Where two devices according to the invention are provided on a manifold 220 (FIG. 6) each positioned in relation to a corresponding carburetor 3 of a twin carburetor arrangement, the tubes 11 may be communicated with one another by a balancing pipe 5, e.g. of a flexible plastic tube, which can be connected at each end to a suitable junction union nut 117 of each device for communication with the tubes 11. In the case of motor vehicle engines practical tests have established that not only is an appreciable economy of fuel consumption obtained but also of considerable importance is the fact that toxic exhaust emission is substantially reduced to an acceptable level. Typical sample test figures are as follows:

The motor vehicle tested as a 1978 Ford "Escort Popular" private car or automobile of British manufacture having an engine capacity of approximately 1100 c.c., the engine being fitted with a single down-draught carburetor. The test runs were carried out on the M1 Motorway in England.

The following fuel consumption results were obtained at an average speed of 70 m.p.h.:

| Without the device | With the device |
|---|---|
| 25.6 miles per imperial gallon | 32.91 miles per imperial gallon. |

This shows an improvement of 28.5% in fuel consumption when the engine inlet manifold is fitted with a device according to this invention in the appropriate manner herein described.

On the same motor vehicle exhaust emission test results were as follows:

|  | Without device | With device |
|---|---|---|
| Engine speed | 800 r.p.m. | 800 r.p.m. |
| Air/fuel ratio | 12.65 to 1 | 3.5 to 1 |
| Carbon monoxide content CO % | 5% | 3% |
| Engine speed | 1000 r.p.m. | 1000 r.p.m. |
| Air/fuel ratio | 12.75 to 1 | 13.75 to 1 |
| Carbon monoxide content CO % | 4.5% | 2.25% |

As will be clearly evident from these figures a substantial reduction in toxic exhaust emission is obtained when the engine inlet manifold is fitted with the device.

Tests carried out on other models of motor vehicle under various running conditions have indicated a fuel economy of the order of 10% to 25% together with reduced toxic exhaust emission.

Figure 7:
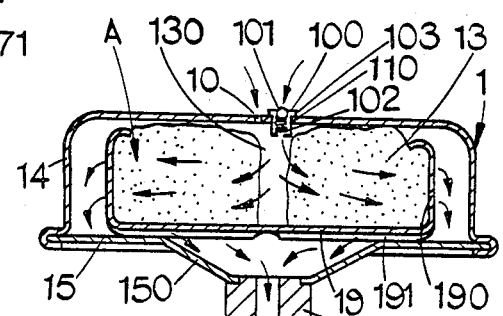
FIG. 7 is a view in axial plane section similar to FIG. 1 but showing a modification.
Figure 2:
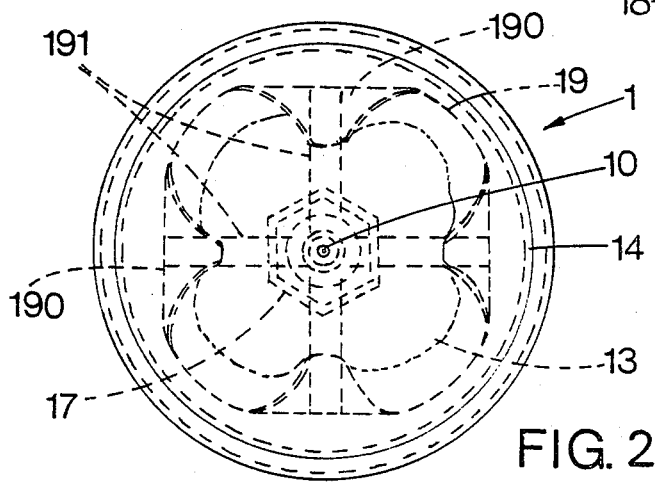
FIG. 2 is a plan view of the device of FIG. 1

With a view to further improving the efficacy of the device a development is shown in FIG. 7 in which the capsule 1 is provided with a valve controlled secondary air inlet orifice 100 to the chamber A, i.e. additional to the inlet orifice 10. The secondary inlet orifice 100 is controlled by a relief valve shown consisting of a ball valve member 101 which is urged by a compression spring 102 to seat against and close the orifice 100.

For this purpose the ball 101 and spring 102 are shown accommodated in a tubular body or insert 103 having the orifice 100 at its outer end and fitted in a hole 110 in the capsule 1 adjacent the primary inlet orifice 10.

At low engine speeds, e.g. up to 1200 r.p.m. or thereabouts the secondary orifice 100 remains closed by the valve member 101 and the device operates in the manner already described by air admission into the chamber A solely through the primary inlet orifice 10. At higher engine speeds the further depression of the sub atmospheric air pressure in the inlet manifold 2 causes the valve member 101 to be drawn away from the secondary orifice 100 against the action of the spring 102 so that air is also admitted into the chamber A through the secondary orifice 100 as well as through the primary orifice 10. Thus such air admission is increased with higher engine speed in order to maintain an appropriate rate of the air admission in relation to fuel/air flow in the manifold 2. To some extent the spring loaded valve member 101 has a variable action in increasing the air admission with increase in engine speed.

The air admission orifices 10, 100 are shown closely and centrally situated together for communication with the central opening 130 in the body 13 of foam material. Otherwise the construction of the device of FIG. 7 is the same as that of FIG. 1 but may be varied according to practical requirements. It will also be apparent from the foregoing and the drawings that the device can be of extremely simple construction and can be readily fitted to an engine inlet manifold. It can also be of compact form which is of considerable advantage in present day motor vehicle engine installations where available space is often somewhat limited. Although the device may be made of metal, it can be cheaply produced in suitable plastic material capable of withstanding operating conditions.

I claim:

1. An air admission device for an inlet manifold of an internal combustion engine comprises:

a closed container providing an air expansion chamber and having a fine metering air inlet orifice for entry of atmospheric air into the chamber so as to be cooled by expansion therein;

an elongate air outlet tube directly and rigidly connected to the container and communicating with the chamber through a wall thereof opposite said air inlet orifice, said air outlet tube being adapted to be fitted in a hole provided therefor in an inlet manifold of an internal combustion engine so that the tube passes through the hole and extends for a substantial distance into the manifold from the chamber of the container, which container in such position of use is thus exteriorly mounted on the manifold;

a body of foam texture material accommodated in the expansion chamber and disposed between the air inlet orifice and the communication of the elongate outlet tube with said chamber, said body of foam material having a central opening therein for receiving air flow from the air inlet orifice; and a deflector plate in the chamber carrying the body of foam texture material and interposed between the latter and the communication of the elongate outlet tube with the chamber, said deflector plate being radially channelled at that side thereof opposite to the body of foam texture material for the passage of air between the deflector plate and the wall of the container adjacent thereto and through which the elongate outlet tube communicates with the chamber, the deflector plate further having side lugs engaging the body of foam texture material for location of said body on the deflector plate and in the chamber with annular clearance therein whereby air entering the chamber through the fine metering air inlet orifice enters the central opening in the body of foam texture material and is deflected radially outwardly therethrough by the deflector plate to the annular clearance for subsequent inward radial flow between the radially channelled side of the deflector plate and the adjacent wall of the container to the communication of the elongate outlet tube and via the latter into the inlet manifold for creating turbulence in the flow of a fuel/air mixture through the manifold into the engine.

2. An air admission device according to claim 1 wherein the container is provided with a further air inlet orifice additional to and closely adjacent to said fine metering air inlet orifice which further orifice is controlled by a valve member of a relief valve co-operating therewith whereby the further air inlet orifice remains closed by the valve member until sub-atmospheric pressure in an inlet manifold to which the device is fitted is further reduced as a result of increased engine speed and which causes the valve member to be drawn from the further air inlet orifice for admission of atmospheric air therethrough into the chamber in the container and into the central opening of the body of foam texture material therein in order to augment the air admission into the chamber and through said body of foam texture material from the aforesaid fine metering air inlet orifice.

* * * * *